(12) United States Patent
Bischoff et al.

(10) Patent No.: US 7,273,304 B2
(45) Date of Patent: Sep. 25, 2007

(54) END REGION OF A VEHICLE WITH A LID

(75) Inventors: Klaus Bischoff, Evessen (DE); Odysseus Andronis, Wolfenbüttel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 33 days.

(21) Appl. No.: 11/185,415

(22) Filed: Jul. 20, 2005

(65) Prior Publication Data
US 2006/0017304 A1 Jan. 26, 2006

(30) Foreign Application Priority Data
Jul. 20, 2004 (DE) .................. 10 2004 035 030

(51) Int. Cl.
*B60Q 1/00* (2006.01)
(52) U.S. Cl. .................. 362/496; 362/503; 116/28 R
(58) Field of Classification Search ............. 362/485, 362/496, 501, 503; 296/203.04, 146.8, 56, 296/76; 116/28 R, 63 T; 40/591
See application file for complete search history.

(56) References Cited
U.S. PATENT DOCUMENTS

| | | | |
|---|---|---|---|
| 4,353,111 A | 10/1982 | Gallitzendörfer et al. | |
| 4,420,797 A | 12/1983 | Tohata | |
| 4,488,141 A | 12/1984 | Ohlenforst et al. | |
| 4,799,730 A * | 1/1989 | Harasaki | 296/203.04 |
| 5,621,942 A * | 4/1997 | Eustache et al. | 15/250.3 |
| 6,350,049 B1 * | 2/2002 | Zimmermann et al. | 362/496 |
| 6,763,778 B2 * | 7/2004 | Bergquist et al. | 116/28 R |

FOREIGN PATENT DOCUMENTS

| | | |
|---|---|---|
| DE | 29 48 524 A1 | 6/1981 |
| DE | 30 32 245 A1 | 4/1982 |
| DE | 196 55 079 C2 | 4/1998 |
| DE | 197 07 614 C2 | 8/1998 |
| DE | 197 14 083 A1 | 10/1998 |
| DE | 199 09 278 A1 | 8/2000 |
| DE | 199 08 252 A1 | 9/2000 |
| EP | 0 053 783 B1 | 6/1982 |
| EP | 0 256 399 B1 | 2/1988 |
| WO | WO96/25311 * | 8/1996 |

* cited by examiner

*Primary Examiner*—Thomas M. Sember

(57) ABSTRACT

A vehicle assembly includes a vehicle end region having lights and having a pivotable lid for closing a vehicle interior space. The pivotable lid has given regions which cover at least some of the lights when the pivotable lid is in a closed position and the pivotable lid is pivoted away from the lights when it is in an open position. The given regions of the pivotable lid have an interior side and an exterior side and are at least semi-transparent such that the given regions are configured to transmit light from the interior side to the exterior side.

10 Claims, 2 Drawing Sheets

END REGION OF A VEHICLE WITH A LID

BACKGROUND OF THE INVENTION

Field of the Invention

The invention relates to an end region of a vehicle with a lid, in particular the rear region of a passenger vehicle provided with a tailgate which can be pivoted upward into an open position.

Tailgates for vehicles may be essentially formed of a frameless glass element. Hinges, actuating elements, closing parts, etc. may be fastened, for example screwed, directly on the glass element. Since the glass element is used as a force-transmitting structural component, the glass element is either restricted in its size or is made as a correspondingly solid or rigid element and is therefore a cost-intensive element. It can be difficult to achieve a good aesthetic appearance. In addition, there is the risk of the glass element being destroyed in a rear end collision due to impact energy introduced into it.

Furthermore, German Patent No. DE 196 55 079 C2 discloses transparent vehicle window modules made of plastic which are either bonded into the vehicle body shell or are fastened thereon through the use of plug-in systems, clip systems or insertion systems and which have recesses formed in them for receiving additional fittings and/or injected base parts for positioning attachments or built-in parts. These attachments or built-in parts may, for example, be a spoiler guide, a mirror foot, an antenna foot, a headlamp housing, a wiper shaft bearing, a holder for a window adjuster, a rod antenna or a mobile communications antenna, a decorative element or even an emblem. After assembly of a vehicle window module of this type, the attachments can be fitted in a simple manner.

German Patent No. DE 197 07 614 C2 discloses a vehicle body part with a load-bearing or stiffening function for the body skin wherein the vehicle body part is formed semi-transparently locally or entirely or else entirely transparently. Existing vehicle parts can be replaced by this body part, and it is possible to improve the aesthetic overall impression of the vehicle. The local or fully semi-transparent formation of the body part enables the latter to also serve as a signaling light covering, as a result of which separate light coverings and lenses can be omitted.

Published, Non-Prosecuted German Patent Application No. DE 199 08 252 A1 describes a body structure for a vehicle with a window part. The latter is assigned a cleaning device coupled to a driving device, the window part and at least one element of the cleaning device being combined to form a component block which can be displaced in the vehicle body structure.

Published, Non-Prosecuted German Patent Application No. DE 199 09 278 A1 discloses a light configuration for the rear region of motor vehicles which have a trunk lid or a tailgate, advantageously substantially manufactured from glass or transparent plastic. In order to be able to optimally use the loading opening for loading the trunk, the rear lights of the vehicle are arranged on the trunk lid or on the tailgate. In addition, the light configuration has at least one safety light which, when the trunk is closed, is covered by the tailgate or by the rear lights arranged thereon or is integrated therein. As a result, when the trunk lid or tailgate is open, light can be emitted to the rear. The safety light may be provided on a body-side edge, in particular a vertical edge, of a loading opening leading into the trunk.

Furthermore, Published, Non-Prosecuted German Patent Application No. DE 197 14 083 A1 describes a door, in particular a tailgate, for a motor vehicle, which has a transparent element, in particular a glass element or a synthetic glass element, and a frame for the latter and in which essentially the entire outer surface of the door is formed by the glass element. The frame is arranged on that side of the glass element which faces the vehicle interior.

The linkage on the vehicle that enables the opening and/or closing of the door and the engagement in a closing device arranged on the vehicle takes place indirectly or directly via this frame which has a closed or interrupted periphery. In this case, electric functional elements, such as antennas and lights, may be integrated in the glass element in a manner known per se. In one embodiment, the frame has a lower crossmember in addition to two longitudinal members and is U-shaped. A second crossmember for stiffening the frame may be arranged at a distance from and parallel to the crossmember. This second crossmember is also used for the securing of a handle element for opening and closing the door and for the positioning of the drive for a wiper. However, the second crossmember has an adverse effect on the visual appearance of the door.

SUMMARY OF THE INVENTION

It is accordingly an object of the invention to provide a vehicle assembly with a pivotable lid which overcomes the above-mentioned disadvantages of the heretofore-known vehicle assemblies with a pivotable lid of this general type and which enhances the appearance of the vehicle and makes the vehicle aesthetically pleasing.

With the foregoing and other objects in view there is provided, in accordance with the invention, a vehicle assembly, including:

a vehicle end region defining a vehicle interior space;
the vehicle end region having lights and having a pivotable lid for closing the vehicle interior space;
the pivotable lid having given regions covering at least some of the lights when the pivotable lid is in a closed position, and the pivotable lid being pivoted away from the lights when the pivotable lid is in an open position; and
the given regions of the pivotable lid having an interior side and an exterior side and being at least semi-transparent such that the given regions are configured to transmit light from the interior side to the exterior side.

In other words, according to the invention, there is provided an end region of a vehicle with a lid, which can be pivoted between a closed position and an open position, for closing a vehicle interior, compartment space or assembly space, and with lights, the lid, in its closed position, covers at least some of the lights and, in the open position, is pivoted away from them, and wherein at least those regions of the lid which cover the lights are formed transparently, but at least semi-transparently. Semi-transparency in this context is to be understood as meaning that the lid is capable of transmitting light from the inside to the outside, so that it is penetrated by the light emitted by the lights, but is not capable of transmitting light or is only partially capable of transmitting light from the outside to the inside.

According to another feature of the invention, the vehicle end region is a vehicle rear region; and the lights are rear lights disposed at the vehicle rear region.

According to yet another feature of the invention, the rear lights include a tail light, a brake light, a turn signal light, a backup light and/or a rear reflector.

According to a further feature of the invention, the pivotable lid is a plastic lid with an interior side and an exterior side, and the plastic lid is transparent at least from the interior side to the exterior side.

According to another feature of the invention, the vehicle end region has lateral outer side regions, the lights are disposed in the lateral outer side regions; and the pivotable lid has integrally formed lateral extensions or protrusions on both sides of the pivotable lid, the lateral extensions respectively face toward the lateral outer side regions for covering at least some of the lights.

According to a further feature of the invention, the pivotable lid includes a wiper system, the wiper system has a wiping area covering at least part of the given regions of the pivotable lid that cover at least some of the lights when the pivotable lid is in the closed position.

According to another feature of the invention, the lights are combined to form a light unit.

According to yet another feature of the invention, the vehicle interior space defined by the vehicle end region is a compartment space.

According to another feature of the invention, the given regions of the pivotable lid that cover at least some of the lights when the pivotable lid is in the closed position are fully transparent.

In accordance with the invention, there is also provided, in combination with a vehicle having a vehicle interior space formed therein a vehicle end region, including:
lights disposed at the vehicle end region;
a pivotable lid for closing the vehicle interior space;
pivotable lid having given regions covering at least some of
   the lights when the pivotable lid is in a closed position,
   and the pivotable lid being pivoted away from the lights
   when the pivotable lid is in an open position; and
the given regions of the pivotable lid having an interior side
   and an exterior side and being at least semi-transparent
   such that the given regions are configured to transmit light
   from the interior side to the exterior side.

A lid formed in the manner described above imparts a more attractive appearance to the vehicle, since it is configured without any gaps. In particular if the lid extends as far as the bumper covering, the absence of gaps also provides an advantage with respect to an aerodynamic flow. Furthermore, the manufacturing outlay is reduced. The assembly outlay is also reduced, since the complicated finishing work to seal the gaps is not needed. The covered lights do not become dirty, and the lid is easy to clean. If the lid is manufactured from plastic, for example polycarbonate, a saving on weight in comparison to glass is achieved and a saving on fuel is also associated with this. In addition, the lights covered by the lid are protected from damage.

For the rear region as end region of the vehicle, the lid or tailgate is advantageously configured in such a manner that it opens up or closes the loading opening and it is provided on both sides with an integral formation or extension (protrusion) which faces the respective outer side of the vehicle and covers rear lights arranged in each case on the body, in particular, however, in each case a rear light unit with at least one tail light, rear fog light, brake light, turn signal light and also a backup light (reversing light), which are arranged on the vehicle body next to the tailgate. If the space provided for positioning a rear light unit on the vehicle body is not large enough for a particular rear light unit, for example if the loading opening is very wide, then the rear light unit can be extended into the tailgate and can thus be divided. The part assigned to the tailgate is then arranged on the inside of the tailgate, with the result that the tailgate is used as a module carrier. The tailgate can advantageously replace the covering lens of that part of the rear light unit which is provided on the tailgate. That part of the rear light unit which is on the body side in each case is then covered by an integral extension or protrusion which is formed on the tailgate next to that part of the rear light unit which is connected to the tailgate.

The tailgate can also be provided with a wiper system. In this case, the wiper system can advantageously be configured in such a manner that the lateral integral extensions or portions thereof are also situated in the wiping area of the wiper blade.

Other features which are considered as characteristic for the invention are set forth in the appended claims.

Although the invention is illustrated and described herein as embodied in an end region of a vehicle with a lid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
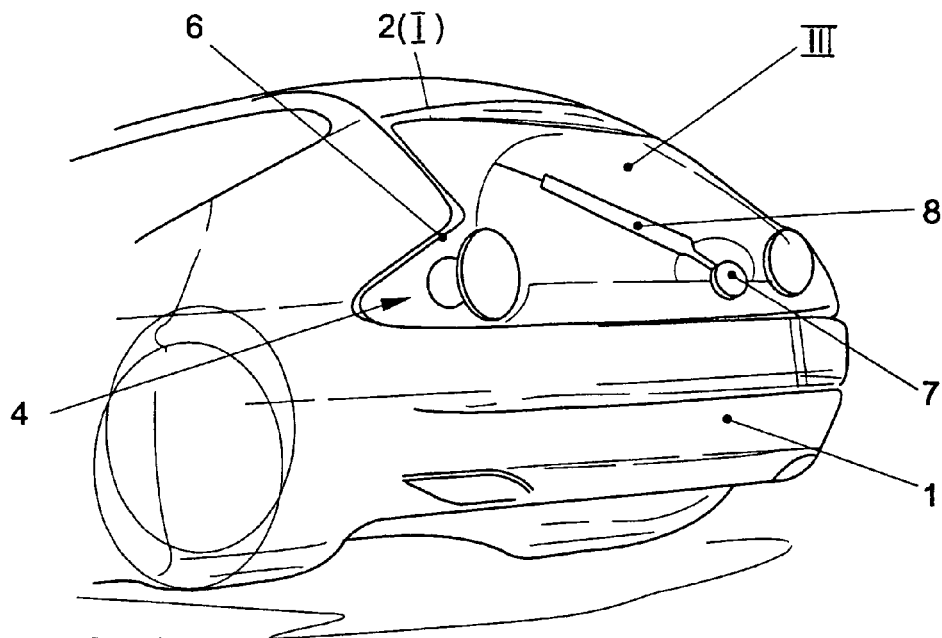
FIG. 1 is a diagrammatic perspective view of a rear region of a vehicle with a tailgate according to the invention.
Figure 2:
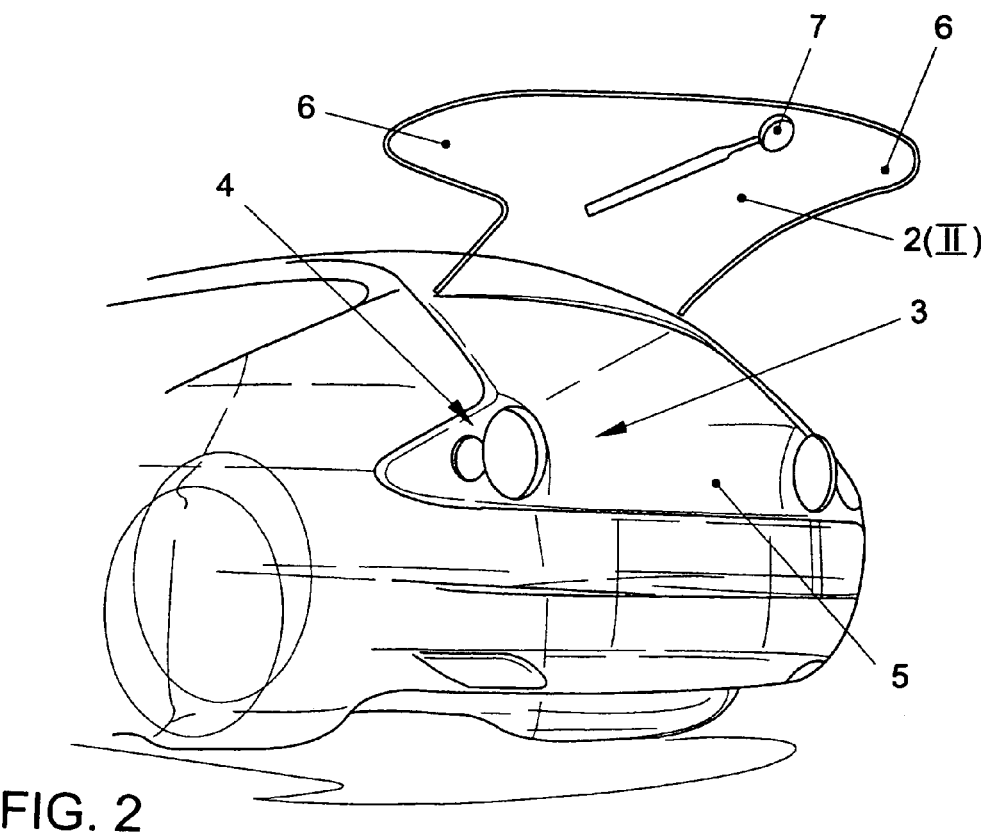
FIG. 2 is a diagrammatic perspective view of a rear region of a vehicle with a tailgate according to the invention with the tailgate in an open position.

Referring now to the figures of the drawings in detail and first, particularly, to FIGS. 1 and 2 thereof, there is shown a rear region of a station wagon or hatchback 1 with a tailgate 2 made of transparent polycarbonate which is fastened on the vehicle roof side, closes the loading space 3 (FIG. 2) of the station wagon 1 and can be pivoted from the closed position I, which is shown in FIG. 1, upward into an open position II, which is shown in FIG. 2. The rear lights indicated, which include in each case a tail light, a rear fog light, a brake light, a turn signal light and a backup lamp on each side of the vehicle, are combined in each case to form a light unit 4 which is arranged fixedly on the vehicle body next to the loading space opening 5. The tailgate 2 has on both sides integral extensions or protrusions 6 which face the respective outer side of the station wagon 1, for completely covering the light units 4. On the lower edge of the tailgate, which otherwise bears with a peripheral edge seal against the edge of the loading space opening 5, which edge is terminated with a crossmember, a (rear) wiper system 7 is also mounted centrally next to a closing device. The wiping zone III of the wiper 8 extends on both sides into the region of the integral extensions 6 under which the light units 4 are provided. FIG. 2 illustrates the rear region of the station wagon with the tailgate 2 pivoted into its open position II.

In this tailgate position, the light units 4 are no longer covered by the transparent integral extensions 6.

Figure 3:
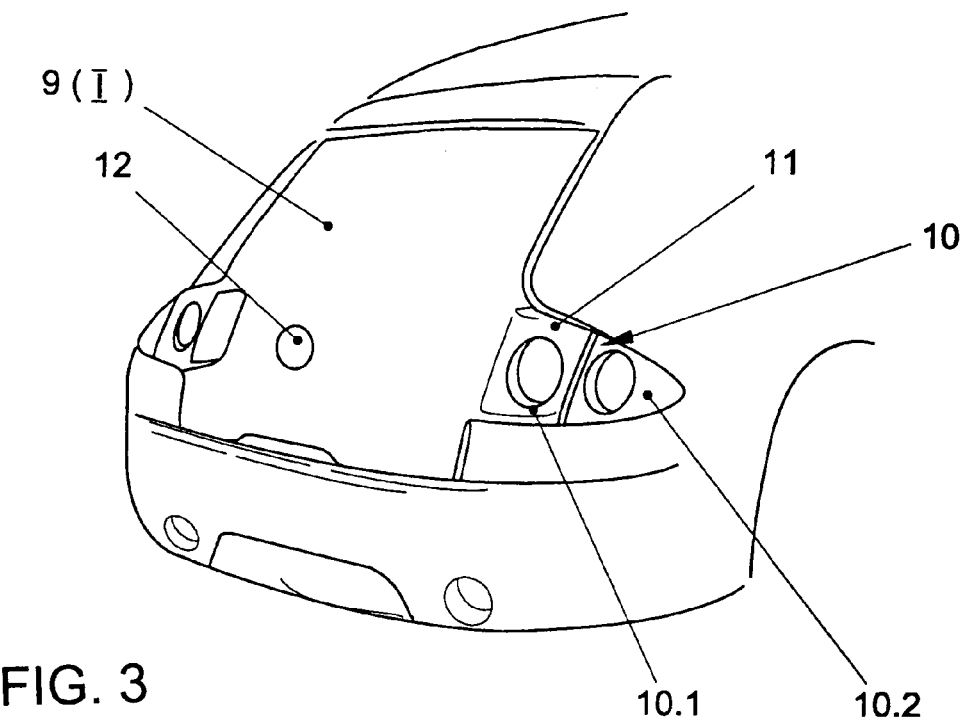
FIG. 3 is a diagrammatic perspective view of a rear region of a further vehicle with a tailgate according to the invention.
Figure 4:
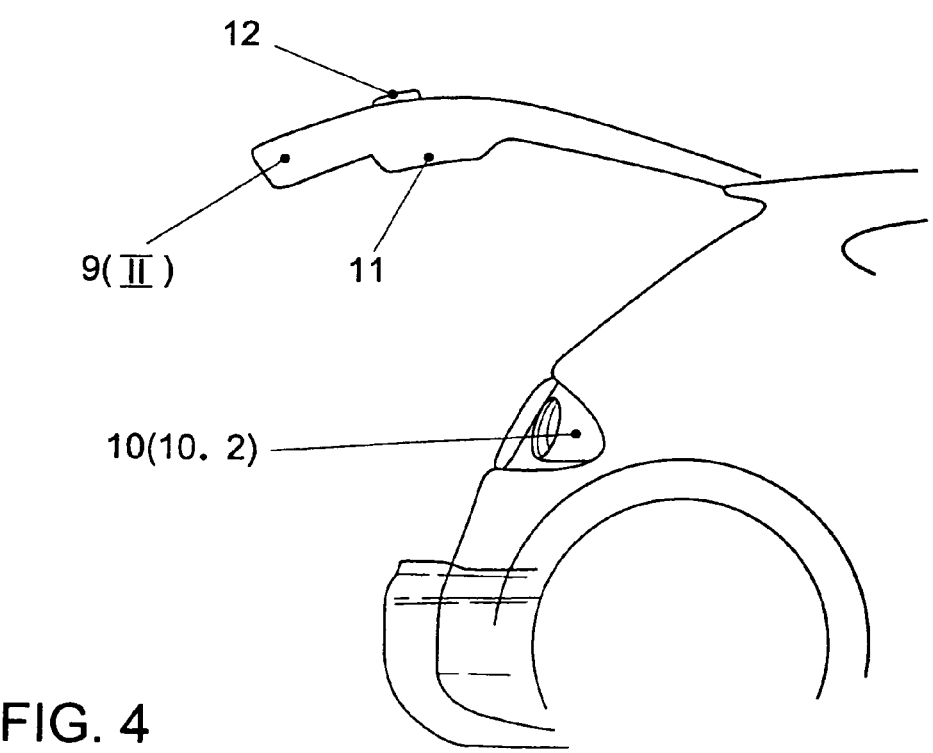
FIG. 4 is a diagrammatic side view of a rear region of a vehicle with a tailgate according to the invention.

FIGS. 3 and 4 illustrate a passenger vehicle's rear region which is configured according to the invention and has a transparent tailgate 9. On this vehicle, the rear light units 10 are formed such that they have a very wide shape and are arranged fixedly in a correspondingly formed body cutout. When the tailgate 9 is closed (closed position I), a light part 10.1 of the particular rear light unit 10, which light part is directed toward the vehicle center, is situated under an integral extension or protrusion 11 formed on the tailgate 9 whereas a light part 10.2, which is arranged on the outer side of the vehicle, is not covered by the tailgate 9. In this case, the covering lens of the rear light unit 10 is lowered or set back in the region of the light part 10.1, with the result that the surface of the tailgate is flush with the surface of the covering lens in the region of the light part 10.2. In the open position II of the tailgate 9 that is shown in FIG. 4, the light part 10.1—and therefore the entire rear light unit 10—is not covered by the tailgate 9. It can also be seen that the tailgate 9 is used as a support for an emblem 12.

This application claims the priority, under 35 U.S.C. § 119, of German patent application No. 10 2004 035 030.2, filed Jul. 20, 2004; the entire disclosure of the prior application is herewith incorporated by reference.

We claim:

1. A vehicle assembly, comprising:
   a vehicle end region defining a vehicle interior space;
   said vehicle end region having lights and having a pivotable lid for closing the vehicle interior space;
   said pivotable lid having given regions covering at least some of said lights when said pivotable lid is in a closed position, and said pivotable lid being pivoted away from said lights when said pivotable lid is in an open position; and
   said given regions of said pivotable lid having an interior side and an exterior side and being semi-transparent such that said given regions are substantially transparent from said interior side to said exterior side but less transparent from said exterior side to said interior side.

2. The vehicle assembly according to claim 1, wherein:
   said vehicle end region is a vehicle rear region; and
   said lights are rear lights disposed at said vehicle rear region.

3. The vehicle assembly according to claim 2, wherein said rear lights include at least one rear light element selected from the group consisting of a tail light, a brake light, a turn signal light, a backup light, and a rear reflector.

4. The vehicle assembly according to claim 1, wherein said pivotable lid is a plastic lid with an interior side and an exterior side, and said plastic lid is transparent at least from said interior side to said exterior side.

5. The vehicle assembly according to claim 1, wherein:
   said vehicle end region has lateral outer side regions, said lights are disposed in said lateral outer side regions; and
   said pivotable lid has integrally formed lateral extensions on both sides of said pivotable lid, said lateral extensions respectively face toward said lateral outer side regions for covering at least some of said lights.

6. The vehicle assembly according to claim 5, wherein said pivotable lid includes a wiper system, said wiper system has a wiping area covering at least part of said given regions of said pivotable lid that cover at least some of said lights when said pivotable lid is in the closed position.

7. The vehicle assembly according to claim 1, wherein said lights are combined to form a light unit.

8. The vehicle assembly according to claim 1, wherein the vehicle interior space defined by said vehicle end region is a compartment space.

9. The vehicle assembly according to claim 1, wherein said given regions of said pivotable lid that cover at least some of said lights when said pivotable lid is in the closed position are fully transparent.

10. In combination with a vehicle having a vehicle interior space formed therein, a vehicle end region, comprising:
    lights disposed at the vehicle end region;
    a pivotable lid for closing the vehicle interior space;
    said pivotable lid having given regions covering at least some of said lights when said pivotable lid is in a closed position, and said pivotable lid being pivoted away from said lights when said pivotable lid is in an open position; and
    said given regions of said pivotable lid having an interior side and an exterior side and being semi-transparent such that said given regions are substantially transparent from said interior side to said exterior side but less transparent from said exterior side to said interior side.

* * * * *